Aug. 28, 1962 F. M. YOUNG ETAL 3,051,791

MULTIPLEXING MEANS

Filed Feb. 28, 1957

INVENTORS.
FRINK MANSFIELD YOUNG
EVAN T. COLTON
BY
Trachtman + Zoda
ATTORNEYS.

United States Patent Office 3,051,791
Patented Aug. 28, 1962

3,051,791
MULTIPLEXING MEANS

Frink Mansfield Young, Boston, and Evan T. Colton, Melrose, Mass., assignors to Epsco, Incorporated, Boston, Mass., a corporation of Massachusetts Filed Feb. 28, 1957, Ser. No. 643,159
6 Claims. (Cl. 179—15)

Figure 1:
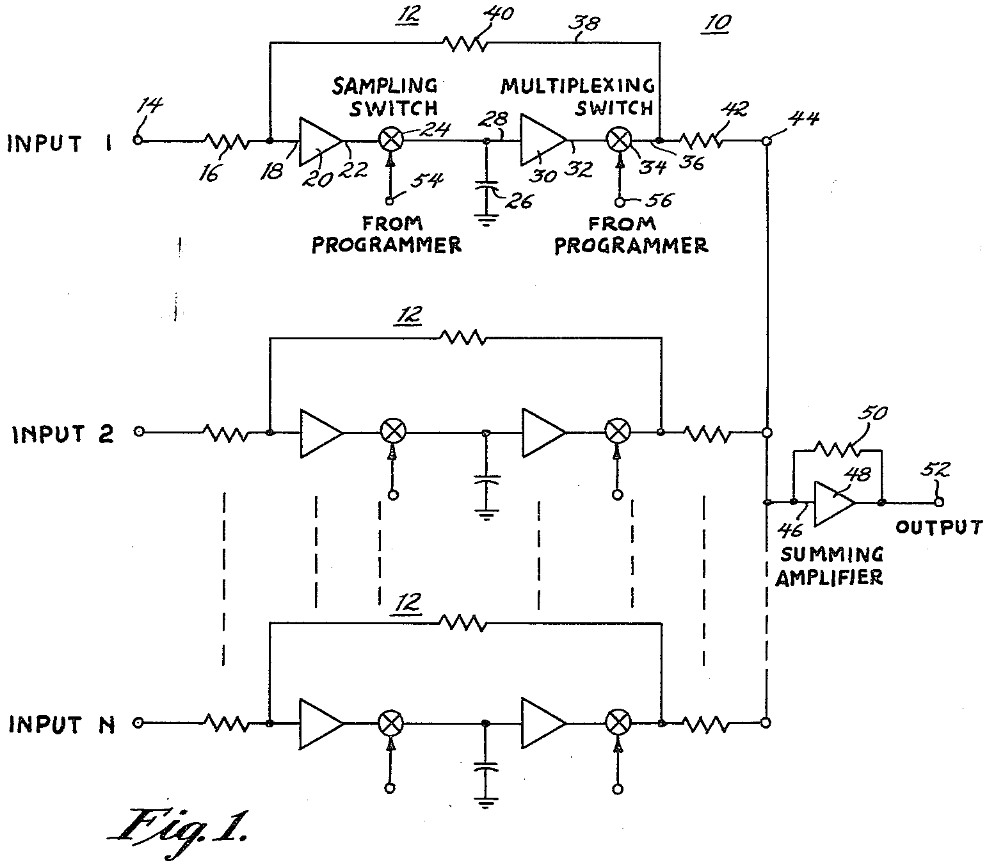

The invention relates to a multiplexing means and more particularly a multiplexing means utilizing switching means for sampling information signals and delivering multiplex output signals.

The multiplexing means utilizing switches which have heretofore been utilized have been unsatisfactory when high accuracy has been required. The inaccuracy of such means has mainly been due to varying characteristics of the switches and other elements utilized which have affected the output signals.

It is therefore a principal object of the invention to provide a new and improved multiplexing means delivering output signals accurately corresponding to the input sampled signals.

Another object of the invention is to provide a new and improved multiplexing means utilizing switches in which the effect of the characteristics of the switches is minimized in the output signal.

Another object of the invention is to provide a new and improved multiplexing means which allows simultaneous sampling of a plurality of respective information signals and subsequent time delivery of output signals corresponding with said sampled signals.

Another object of the invention is to provide a new and improved multiplexing means which is readily adapted for various modes of operation and programming.

Another object of the invention is to provide a new and improved multiplexing means which may be easily adapted for handling any number of information signals or channels by the addition of circuitry units.

Another object of the invention is to provide a new and improved multiplexing means which is simple in operation.

The above objects are achieved by providing a multiplexing network comprising a plurality of circuits each having an input terminal adapted to receive an information signal and an output signal. A first amplifier unit has an input terminal for receiving signals from said input terminal and an output. A first switching means controllably delivers signals from the output of the first amplifier to a storage device such as a capacitor. A second amplifier unit has an input receiving signals from the first switching means and the storing device and has an output delivering signals to a second switching means. The second switching means controllably delivers signals from the output of said second amplifier unit to the output terminal of the circuit. A loop return means delivers inverse feedback signals from the second switching means to the input of the first amplifier unit.

In operation, each of said circuits samples the information signal on its respective input terminal when the first and second switching means are concurrently closed. After the sampling operation the first and second switching means are opened and multiplexed output signals are delivered corresponding to the sampled signals when respective second switch means are sequentially closed.

The arrangement of the amplifier units, switch means, and loop return means minimizes the effect of changes in their characteristics upon the output signal of said circuit.

Figure 2:
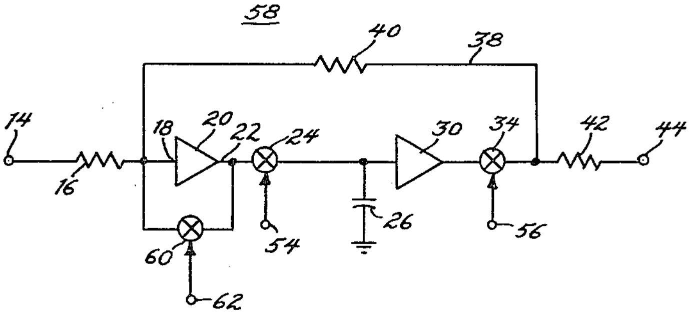

The above objects as well as many other objects of the invention will become apparent when the following description is read in connection with the drawings, in which:

FIGURE 1 is a schematic diagram illustrating a multiplexing network embodying the invention and including a plurality of multiplexing circuits, and FIGURE 2 is a modified form of multiplexing circuit.

Like reference numerals designate like parts throughout the several views.

Refer to FIGURE 1 which discloses a multiplexing network 10 comprising a plurality of multiplexing circuits 12.

Each of the multiplexing circuits 12 has an input terminal 14 adapted to receive respective information signals which may be connected through a resistor 16 to the input 18 of an amplifier 20. The output 22 of the amplifier 20 is controllably connected through a switch 24 to a signal storage capacitor 26 which is passed to ground potential and the input 28 of a second amplifier 30.

The output 32 of the amplifier 30 is controllably delivered through a switch 34 to the line 36. A return loop 38 which may comprise a resistor 40 connects the line 36 with the input 18 of the amplifier 20 for delivering an inverse or negative feedback signal. The line 36 is also connected through a resistor 42 to an output terminal 44 of the circuit 12.

When using a resistor as the inverse feedback path the gain in the forward path is —K. In the system shown in FIG. 1 the product of the gains of the amplifiers 20 and 30 is the forward gain, and, therefore, is —K. Numerous combinations of gains to provide this result are apparent to those skilled in the art. As an example, however, amplifier 20 could have a gain of —K while amplifier 30 could have a gain of nearly plus one.

The output terminals 44 are connected together and joined to the input 46 of an output amplifier 48 which has a negative feedback loop 50. The amplifier 48 delivers its output signals to the output multiplexing terminal 52.

The switches 24 and 34 may be of the well-known electronic type which may respectively be controlled by signals on their respective control terminals 54 and 56. The signals delivered to the terminals 54 and 56 for controlling the opening and closing of the switches 24 and 34 may be derived from a programmer.

In operation, each of the circuits 12 of the multiplexing network 10 operates to sample the information signal on its input terminal 14 when control signals are simultaneously delivered to the terminals 54 and 56 closing the switches 24 and 34. At such time the signal on the input terminal 14 is delivered to the input 18 of amplifier 20 together with a negative feedback signal from the loop 38. The output signal of the amplifier 20 is passed through the switch 24 and is stored in the charging capacitor 26. This signal also is amplified by the unit 30 and passed through the switch 34 to produce the negative feedback signal over the loop 38. The output signal from the switch 34 is also delivered to the output terminal 44 of the circuit 12.

At this time, amplifiers 20 and 30 with resistors 40 and 16 function as a single "operational amplifier" having a gain equal to the negative of the ratio of the ohmic value of resistor 40 to the ohmic value of resistor 16. The term "operational amplifier" is used herein to denote the type of amplifier described on pages 22 to 26 of Pulse and Digital Circuits, by Millman and Taub, published by McGraw-Hill.

Resistor 42 functions to isolate junction 36 from the signals delivered by other channels to terminal 44 so that the servoing signal inversely fed back to the input of amplifier 20 in a particular channel is a function only of the output from amplifier 30 in its own channel.

After a signal is stored in the charging capacitor 26 which corresponds to the information signal on the input terminal 14, the switch 24 is opened preventing any change in the signal stored by the capacitor 26. Soon thereafter, the control signal on the terminal 56 opens the switch 34 preventing the delivery of an output signal from the amplifier 30 to the output terminal 44.

An output signal from the amplifier 30 may now be delivered to the output terminal 44 corresponding to the information signal on terminal 14 which was sampled by the circuit 12 upon the delivery of a signal to the switch 34 closing it. This occurs because with switch 24 open, there is no closed loop and amplifier 30 functions to amplify the signal held on capacitor 26. This signal is coupled to terminal 44 through resistor 42.

It is noted that the manner in which the switches 24 and 34 are positioned within the circuit 12 minimizes the effect of changes in their characteristic upon the output signal of the circuit. This will be evident from noting that the feedback signal delivered by the loop 38 minimizes such variations which may occur in the characteristics of the switches and other such elements. The switches 34 and 24 are also respectively positioned at the outputs of the amplifiers 30 and 20 further minimizing their effect in the accuracy of the output signals. It is also noted that a multiplexing operation usually is carried out so rapidly that the charge of the capacitor 26 changes insignificantly between the time the input signal is sampled and an output multiplexing signal is delivered by the circuit 12.

Thus, it is apparent that the network 10 may simultaneously sample a plurality of information signals or channels respectively delivered to the input terminals 14 of its circuits 12 by receiving control signals causing their switches 24 and 34 to be closed. In this mode of operation, it is noted that the output amplifier 48 will also deliver a signal to the output terminal 52 corresponding to the sum affect of the simultaneous to output signals of all of the circuits 12.

After the sampling operation the switches 24 and 34 are opened and sequential output signals may be derived in any order or sequence desired by closing respective switches 34 of the circuits 12.

Refer now to FIGURE 2 which discloses a multiplexing circuit 58 which is a modified form of the circuit 12 of the network 10. The multiplexing circuit 58 is identical to the circuit 12 shown in FIGURE 1, except that it is provided with a third switch 60 which is connected between the output 22 of the amplifier 20 and its input 18 for delivering an inverse or negative feedback signal. The switch 60 which may be similar to the switches 24 and 34 is controlled by a signal delivered to its control terminal 62.

The multiplexing circuit 58 may be substituted for the circuit 12 to form the multiplexing network 10 of FIGURE 1. When the circuit 58 is sampling the signal on its input terminal 14, the switch 60 is opened while the switches 24 and 34 are closed. This produces a circuit which is equivalent to the circuit 12 when it is sampling its signal and operates in the identical manner for this sampling procedure.

The sampling switch 24 may now be opened to retain the sampled signal in the storage capacitor 26 after which the switch 34 may be opened and the switch 60 closed.

With the switch 60 closed, a negative feedback signal is delivered to the amplifier 20 maintaining its input lead 18 at substantially zero input signal. In this manner, the output terminal 44 is connected by the resistors 42 and 40 to the zero input signal potential at the input 18 of the amplifier 20.

The circuit 58 may now deliver an output signal corresponding to the sampled signal at a time after the sampling operation by the closing of the multiplexing switch 34. This is due to the fact that a signal corresponding to the sampled switch is retained at the input to the amplifier 30 by the storage capacitor 26 allowing the amplifier 30 to deliver its signal to the output terminal 44.

When the multiplexing switch 34 is again opened to terminate the delivery of the multiplexing signal by the circuit 58, the terminal 44 resumes its former signal level due to tis being connected to zero potential through resistors 42 and 40 as previously explained.

It is therefore particularly noted that the circuit 58 has a specific advantage in that its output terminals 44 are connected to a reference zero potential signal level at the input of amplifier 20 except when the information signals on the various channels are being sampled.

Although the multiplexing circuits 12 and 58 have been described in connection with the particular multiplexing network 10, it is noted that these circuits may be usefully employed alone and in combination with other such circuits retaining their advantage of minimizing the effect of the switching characteristics and maintaining a high degree of accuracy in the multiplexed signals.

It will, of course, be understood that the description and drawings, herein contained, are illustrative merely, and that various modifications and changes may be made in the apparatus disclosed without departing from the spirit of the invention.

What is claimed is:

1. A multiplexing circuit comprising an input terminal adapted to receive an information signal, and an output terminal; a first amplifier unit having an input for receiving signals from said input terminal, and an output; a signal storing device; a first switching means controllably transmitting signals from the output of said first amplifier to said storing device; a second amplifier unit having an input receiving signals from said first switching means and said storing device, and an output; a second switching means controllably transmitting signals from the output of said second amplifier unit to said output terminal; and a loop return means for delivering inverse feedback signals from said second switching means to the input of said first amplifier unit to cause said first and second amplifier units and said loop return means to constitute an operational amplifier when said first and second switching means are conditioned to transmit signals.

2. A multiplexing circuit comprising an input terminal adapted to receive an information signal and an output terminal, a first amplifier unit having an input for receiving signals from said input terminal and an output; a signal storing device; a first switching means controllably transmitting signals from the output of said first amplifier to said storing device; a second amplifier unit having an input receiving signals from said first switching means and said storing device, and an output; a second switching means controllably transmitting signal from the output of said second amplifier unit to said output terminal; a loop return means for delivering inverse feedback signals from said second switching means to the input of the said first amplifier unit; said first and second amplifier units and said loop return means forming an operational amplifier when said first and second switching means are conditioned to transmit signals; and a third switching means controllably closed for delivering an inverse feedback signal from the output of said first amplifier unit to its input.

3. A multiplexing network comprising a plurality of circuits each including an input terminal adapted to receive a respective information signal; an output terminal; a first amplifier unit having an input for receiving signals from its said input terminal, and an output; a signal storing device; a first switching means controllably delivering signals from the output of said first amplifier to said storing device; a second amplifier unit having an input receiving signals from said first switching means and said storing device, and an output; a second switching means controllably delivering signals, from the output of said storing device to said output terminal; a loop return menas for delivering inverse feedback signals from said second switching means to the input of said first amplifier unit; and a third switching means controllably closed for delivering an inverse feedback signal from the output of said first amplifier unit to its input; each of said circuits sampling its respective information signal when only its first and second switching means concurrently deliver output signals while thereafter delivering a multiplexing output signal for said sampled signal when only said second and third switching means deliver output signals; said third switching means being closed except when said third switching means delivers an output signal.

4. In a multiplexing system, apparatus comprising, first and second amplifiers, a multiplexing channel input terminal for supplying input signals to the first amplifier, signal storage means, means providing a feedback path between the output of the second amplifier and the input of the first amplifier, the signal storage means being connected in the input of the second amplifier and obtaining its stored signal from the output of the first amplifier, first and second switches connected respectively in the outputs of the first and second amplifiers, a multiplexing channel output terminal, and means controlling the operation of the switches whereby a first mode of operation connects the first and second amplifiers to function as an operational amplifier and causes the signal storage means to obtain a storage signal and a second mode of operation uncouples the signal storage means from the output of the first amplifier and couples the output of the second amplifier to the multiplexing channel output terminal.

5. Apparatus in accordance with claim 4, further including means providing a feedback path between the output and input of the first amplifier, and a third switch in the last-named feedback path for rendering the first amplifier operative as an operational amplifier in the second mode of operation.

6. In a multiplexing system, a plurality of multiplexing signal channels, each multiplexing channel having a signal input and a signal output terminal and apparatus comprising first and second amplifiers, means providing a feedback path between the output of the second amplifier and the input of the first amplifier, a storage capacitor coupled to the input of the second amplifier, a first switch interposed between the output of the first amplifier and the storage capacitor, and a second switch interposed between the output of the second amplifier and the channel output terminal, and the multiplexing system including an operational amplifier having its input connected to the output terminal of each multiplexing channel.

References Cited in the file of this patent

UNITED STATES PATENTS

| | | |
|---|---|---|
| 2,438,908 | Goodall | Apr. 6, 1948 |
| 2,521,733 | Lesti | Sept. 12, 1950 |
| 2,539,623 | Heising | Jan. 30, 1951 |
| 2,580,421 | Guanella | Jan. 1, 1952 |
| 2,629,857 | Deloraine | Sept. 14, 1953 |
| 2,643,293 | Aigrain | June 23, 1953 |
| 2,658,997 | Carbrey et al. | Nov. 10, 1953 |
| 2,724,740 | Cutler | Nov. 22, 1955 |
| 2,839,619 | Johnstone | June 17, 1958 |
| 2,870,259 | Norris | Jan. 20, 1959 |
| 2,902,542 | Treadwell | Sept. 1, 1959 |